United States Patent [19]

Poncha

[11] Patent Number: 5,137,640
[45] Date of Patent: Aug. 11, 1992

[54] PROCESS FOR THE SEPARATION OF ARSENIC ACID FROM A SULFURIC ACID-CONTAINING SOLUTION

[75] Inventor: Rustom P. Poncha, Erie County, N.Y.

[73] Assignee: Allied-Signal Inc., Morris Township, Morris County, N.J.

[21] Appl. No.: 695,824

[22] Filed: May 6, 1991

[51] Int. Cl.⁵ .......................... C02F 1/58; C02F 1/64
[52] U.S. Cl. .................................... 210/724; 210/726; 210/911; 423/87; 423/602; 423/617
[58] Field of Search ............... 210/911, 702, 723, 724, 210/726; 423/87, 601, 602, 617

[56] References Cited

U.S. PATENT DOCUMENTS

| | | | |
|---|---|---|---|
| 4,103,000 | 7/1978 | Hartford | 424/133 |
| 4,118,243 | 10/1978 | Sandesara | 210/919 |
| 4,241,039 | 12/1980 | Koh et al. | 423/87 |
| 4,438,079 | 3/1984 | Nakano et al. | 423/87 |
| 4,610,723 | 9/1986 | Nogueira et al. | 423/87 |
| 4,622,149 | 11/1986 | Devuyst et al. | 210/717 |
| 4,804,494 | 2/1989 | Egerton et al. | 252/397 |
| 4,959,203 | 9/1990 | Knoerr et al. | 423/602 |
| 4,961,909 | 10/1990 | Boateng | 423/87 |
| 5,002,748 | 3/1991 | Jones et al. | 423/42 |
| 5,024,769 | 6/1991 | Gallup | 210/911 |
| 5,026,530 | 6/1991 | Drinkard, Jr. et al. | 423/87 |

OTHER PUBLICATIONS

Tanija et al., "Formation and Stability Studies of Iron-Arsenic and Copper Arsenic Compounds From Copper Electrorefining Sludge", 1988.

Primary Examiner—Stanley S. Silverman
Assistant Examiner—Neil M. McCarthy
Attorney, Agent, or Firm—Melanie L. Brown; Jay P. Friedenson

[57] ABSTRACT

A process for reducing arsenic levels in a solution containing sulfuric acid, water, and arsenic acid by adding copper or a copper-containing compound to the solution to form dissolved copper arsenate, adding alkali solution to precipitate the copper arsenate and to neutralize arsenic and sulfuric acid. The copper arsenate is separated, and the remaining solution is treated with a ferric compound and an alkali in order to form ferric arsenate to remove residual arsenate. The ferric arsenate is separated and the remaining solution contains less than about 0.79 ppm arsenic. The ferric compound is added so that the ratio of iron to arsenic is about 8:1 to about 10:1 and alkali is added during this step to adjust the pH to from about 5 to about 7.

15 Claims, No Drawings

PROCESS FOR THE SEPARATION OF ARSENIC ACID FROM A SULFURIC ACID-CONTAINING SOLUTION

BACKGROUND OF THE INVENTION

This invention relates to a process for the separation of arsenic acid from a sulfuric acid-containing solution. More particularly, this invention provides a process for the separation of arsenic acid from a sulfuric acid-containing solution wherein the arsenic acid is converted to copper arsenate which can be used as a raw material for the manufacture of wood preservatives.

In some manufacturing processes, waste mixtures of sulfuric acid, water, and arsenic acid result. It would be advantageous to have a process wherein arsenic acid in such waste mixtures is transformed into a useful product and any residual arsenic acid in the resulting solution is removed.

As such, the need exists in the art for a process for the transformation of arsenic acid in such waste mixtures of arsenic and sulfuric acids and water to a useful product and the removal of any residual arsenic acid in the resulting solution.

Methods exist in the art for generating useful products from arsenic acid. For example, methods for the preparation of copper arsenates from arsenic acid wherein sulfuric acid is not part of the reaction medium are taught by U.S. Pat. Nos. 4,103,000; 4,804,494; 4,959,203; and 5,002,748; and Mirza et al., "Formation and Stability Studies of Iron-Arsenic and Copper-Arsenic Compounds from Copper Electrorefining Sludge", Arsenic Metall. Fundam. Appl. Proc. Symp. 37 (1988).

U.S. Pat. No. 4,103,000 teaches the preparation of copper arsenate slurries by reacting copper metal and an oxidizing agent. The catalyst is a strong acid such as $HNO_3$, HCl, and $H_2SO_4$ and oxygen gas is used as the oxidizing agent. The method requires long reaction times of four to 10 hours.

U.S. Pat. No. 4,804,494 teaches the preparation of copper arsenate by reacting copper metal with a solution of sodium arsenate, a solution or suspension of arsenic trioxide of at least 50 percent by weight concentration in the presence of hydrogen peroxide having a concentration of 50 to 75 percent by weight.

U.S. Pat. No. 4,959,203 teaches the preparation of copper arsenate by reaction of a solution of sodium arsenate with copper sulfate to first form a copper and arsenic-containing solution without precipitating copper arsenate by controlling the pH to precipitate the impurities. After removal of the impurities, the solution is neutralized to precipitate copper arsenate. See also U.S. Pat. No. 5,002,748.

Mirza et al., supra, teach the formation of copper arsenates at room temperature by the reaction of arsenic acid in a concentration of ten grams per liter of arsenic solution with copper in a concentration of thirty grams per liter of solution at a pH of 4.5 at room temperature. At low temperature, copper arsenate, $Cu_3(AsO_4)_2$, is formed and at elevated temperature, copper hydroxy arsenate, $Cu(OH)CuAsO_4$ is formed.

A method for the preparation of copper arsenates from a solution formed from mixing a copper sulfate/sulfuric acid solution with an arsenic acid solution is taught by U.S. Pat. No. 4,961,909. The reference teaches that an arsenic-containing material is subjected to an oxidative pressure leach with sodium hydroxide forming a leach solution containing sodium arsenate. The solution of sodium arsenate is treated with copper sulfate to precipitate copper arsenate and give a solution of sodium sulfate. At least one of the sodium arsenate-containing solution and the sodium sulfate solution is subjected to electrolysis with membranes for at least partial conversion to arsenic acid and sulfuric acid, respectively, and sodium hydroxide. The sulfuric acid generated may be used in the preparation of the copper sulfate.

These references do not address how to remove residual arsenic from the waste mixture after copper arsenate is formed. In an attempt to separate arsenic acid from the waste mixtures of arsenic and sulfuric acids and water, bipolar membranes were used. These membranes did not prove to be useful for this separation because the solutions had to be diluted with water and still, good separation did not occur.

Also in an attempt to separate arsenic acid from the waste mixtures of arsenic and sulfuric acids and water, ion exchange was used. Ion exchange also did not prove to be useful for this separation because the solutions had to be diluted with water so as to not attack the ion exchange resin. Then, acid had to be added to regenerate the ion exchange resin and still, good separation did not occur.

Also in an attempt to separate arsenic acid from the waste mixtures of arsenic and sulfuric acids and water, solvent extraction was used. Solvent extraction also did not prove to be useful because sulfuric acid was co-extracted with the arsenic acid.

Also in an attempt to separate arsenic acid from the waste mixtures of arsenic and sulfuric acids and water, sulfide precipitation which involved hydrogen sulfide or sodium hydrogen sulfide was used. Sulfide precipitation is not advantageous because the sulfide precipitate is sticky and difficult to handle.

Also in an attempt to separate arsenic acid from the waste mixtures of arsenic and sulfuric acids and water, the addition of titanium to precipitate titanium arsenate was used. Titanium arsenate precipitation did not prove to be useful because only 70% of the arsenic is precipitated and then the titanium arsenate had to be converted to copper arsenate.

SUMMARY OF THE INVENTION

Based on the preceding unsuccessful attempts, it was surprising when I arrived at a process which effectively separates arsenic acid from a solution comprising sulfuric acid, water, and arsenic acid. Step (a) of the present process involves reacting the solution with a copper or copper-containing compound in an amount sufficient and at a temperature sufficient to produce copper arsenate. In step (b), an alkali solution is added to the solution resulting from step (a) in an amount sufficient to precipitate the produced copper arsenate and solubilize the sulfate salt of the alkali. In step (c), the precipitated copper arsenate is separated from the solution resulting from step (b). The separated copper arsenate can then be advantageously used as a raw material for the preparation of wood preservatives.

The solution resulting from step (c) comprises water, a sulfate salt of the alkali, and arsenic in the form of an arsenate salt of the alkali. In step (d), a soluble ferric-containing compound is added to the solution resulting from step (c) in an amount sufficient to reduce the residual arsenic therein. The formed ferric arsenate is then separated from the solution resulting from step (d). The filtrate then has an arsenic content below 0.79 parts per million which is considered nonhazardous.

The present Process generates copper arsenate which is a useful product and avoids the waste disposal costs now associated with hazardous arsenic waste.

Other advantages of the present invention will be apparent from the following description and attached claims.

DETAILED DESCRIPTION OF THE PREFERRED EMBODIMENTS

The starting material of the present invention may be obtained from any process that generates a waste mixture of arsenic and sulfuric acids. Preferably, the waste mixture comprises about 50 to about 60 percent by weight sulfuric acid, about 20 to about 45 percent by weight water, and about 5 to about 20 percent by weight arsenic acid.

The first step of the present process involves reacting the waste mixture with copper or a copper-containing material to .pProduce copper arsenate.

Copper or a copper-containing compound is reacted with the waste mixture of arsenic and sulfuric acids and water. Preferred copper-containing compounds includes cupric oxide, copper sulfate, copper nitrate, copper chloride, and copper hydroxide. Although copper or any copper-containing material may be used, cupric oxide is most preferred because it begins to react immediately with the sulfuric acid and thus later, less alkali is required in the neutralization step. The cupric oxide is added in an amount sufficient to react with the arsenic to form copper arsenate. Preferably, the amount of cupric oxide added to the waste mixture is about ten percent over stoichiometric. Preferably, the reaction temperature is about 60° C. to about 100° C. At less than 60° C., the reaction may be too long for commercial purposes; temperatures greater than 100° C. are not required. The reaction which occurs is:

$$CuO + H_2SO_4 \rightarrow CuSO_4 + H_2O$$

The copper sulfate then combines with the arsenic acid to form copper arsenate if the lower reaction temperature is used, or copper arsenate hydroxide if the higher reaction temperature of about 90° C. to about 95° C. is used. It is preferred to form copper arsenate hydroxide because it is easier to filter precipitated copper arsenate hydroxide than to filter precipitated copper arsenate. The reaction which occurs at higher temperatures is:

$$2CuSO_4 + H_3AsO_4 + H_2O \rightarrow Cu(OH)CuAsO_4 + 2H_2SO_4$$

For purposes of the following discussion, the term "copper arsenate" includes copper arsenate hydroxide and any other form of copper arsenate.

The copper arsenate remains dissolved in the solution. An alkali solution which solubilizes the sulfate salt of the alkali is added to the solution in an amount sufficient to neutralize the acid and solubilize the sulfate salt of the alkali; this causes the copper arsenate to precipitate out of the solution. Typically, the alkali is added in amount sufficient to cause the pH of the solution to be about 6.5 to about 7.0 and to solubilize the sulfate salt of the alkali. If the pH of the solution is less than about 6.5, the filtrate contains too much copper and thus, the maximum amount of copper arsenate is not generated; if the PH of the solution is greater than about 7.0, the filtrate contains more arsenic than desired and again the maximum amount of copper arsenate is not generated. Also, too much copper or too much arsenic in the filtrate creates yield losses and larger disposal problems. Preferred soluble alkali include commercially available sodium hydroxide and potassium hydroxide. The most preferred alkali is sodium hydroxide. The reaction which occurs is:

$$H_2SO_4 + 2NaOH \rightarrow Na_2SO_4 + 2H_2O$$

The following reaction also occur:

$$H_3AsO_4 + 3NaOH \rightarrow Na_3AsO_4 + 3H_2O$$

The precipitated copper arsenate is removed from the solution by using any known separation technique such as filtration. The separated copper arsenate is then washed with water until free of sulfate and dried by heating at 110° C. The precipitated copper arsenate comprises from about 20 to about 50 percent by weight water, about 25 to about 50 percent by weight copper, about 15 to about 35 percent by weight arsenic, up to 3 percent by weight sodium, and up to 3 percent by weight sulfate.

During recent years, wood preservatives known as chromated copper arsenates (CCA) have become widely used. The chromated copper arsenates contain as active ingredients copper as cupric ion, chromium usually as the dichromate ion, and arsenic as acid arsenate ion. In 1986, about 40 million pounds of arsenic trioxide were used for the manufacture of chromated copper arsenate wood preservatives. The copper arsenate separated in the present process can be used in a dry state as an intermediate for the preparation of a useful wood preservative. Also, the copper arsenate separated in the present process can be dissolved in commercially available chromic acid so as to produce an intermediate product which can be converted into a useful product by known wood preservative preparation techniques. In order to avoid handling the copper arsenate solid and hygiene problems, the copper arsenate can be immediately dissolved in a solution of chromic acid. Preferably, the copper arsenate is dissolved in a solution of chromium trioxide and water wherein the weight ratio of chromium trioxide to copper arsenate is about 1.5 to about 2.0.

After separation of the copper arsenate from the solution, the remaining solution comprises about 85 to about 90 percent by weight water, about 10 to about 15 percent by weight sodium sulfate, and about 50 to about 100 parts per million arsenic in the form of sodium arsenate. The solution is then treated with a ferric compound which is soluble in the solution in an amount sufficient to convert the sodium arsenate to ferric arsenate and thus, to reduce the amount of arsenic in the solution. The ferric compound can be inorganic or organic. Preferred ferric compounds include ferric sulfate, ferric chloride, and ferric nitrate. A useful organic ferric compound is ferric acetate. The most preferred ferric compound is ferric sulfate. Typically, the amount of ferric sulfate added is in the ratio of Fe:As of from about 8:1 to about 10:1 and a pH of about 5 to about 7. The reaction which occurs is:

$$2Na_3AsO_4 + Fe_2(SO_4)_3 \rightarrow 2FeAsO_4 + 3Na_2SO_4$$

When excess ferric sulfate is used, ferric hydroxide also forms according to the following reaction:

$$Fe_2(SO_4)_3 + 6NaOH \rightarrow 2Fe(OH)_3 + 3Na_2SO_4$$

This is advantageous because ferric hydroxide acts as an absorbing agent for ferric arsenate.

The solution is then filtered. The solid comprises ferric arsenate and ferric hydroxide. This solid is a hazardous waste which can be disposed of properly.

The arsenic in the filtrate is determined colorimetrically and by Inductively Coupled Plasma analysis. The filtrate comprises about 85 to about 90 percent by weight water, about 10 to about 15 percent by weight sodium sulfate, and preferably, below about 0.79 parts per million of arsenic; this filtrate meets the applicable United States Environmental Protection Agency requirements.

The present invention is more fully illustrated by the following non-limiting Examples.

EXAMPLE 1

Example 1 is directed to a process for the preparation of copper arsenate.

Waste containing 60 percent by weight sulfuric acid ($H_2SO_4$), 8.3 percent by weight arsenic acid ($H_3AsO_4$), and 31.7 percent by weight water was used. 600 grams of the waste was diluted with 600 grams of water and the resulting mixture was heated to about 90° C. 62 grams of cupric oxide (CuO) which was 11 percent above the stoichiometric amount required for the formation of copper hydroxy arsenate were added gradually with stirring to the mixture and heating continued until all of the cupric oxide had reacted.

The solution was neutralized by the gradual addition of sodium hydroxide (NaOH) solution which consisted of 300 grams of sodium hydroxide dissolved in about 900 milliliters of water. A blue precipitate formed first which changed to dark green when the pH reached 7.0. The slurry was heated for about 30 minutes and filtered through a Buchner funnel. The precipitate was washed with hot water until free of sulfate. The precipitate was dried at 110° C. Different samples of the product had the following analyses in weight percent:

| Batch | % Cu  | % As  | % Na | % SO4 |
|-------|-------|-------|------|-------|
| 1     | 32.71 | 21.02 | 1.43 | 1.52  |
| 2     | 33.67 | 21.36 | 1.47 | 1.35  |
| 3     | 35.75 | 21.28 | 1.50 | 1.66  |

These compositional differences may be due to the formation of a mixture of copper arsenate, copper arsenate hydroxide, and like compounds.

EXAMPLE 2

Example 2 is directed to a process for the preparation of a wood preservative intermediate product from the Batch 3 copper arsenate of Example 1. Expressing the composition as the oxides of copper and arsenic, the sample contained 44.75 percent by weight copper as CuO and 32.63 percent by weight arsenic as $As_2O_5$.

220 grams of the Batch 3 copper arsenate were added to a solution of 308 grams of chromium trioxide ($CrO_3$) in 733 milliliters of water and the solution was warmed. The copper arsenate dissolved giving a dark brown solution having the following composition of the active ingredients: 64.4 Percent by weight chromium trioxide, 20.6 percent by weight copper oxide, and 15.0 percent by weight arsenic pentoxide ($As_2O_5$).

This intermediate product can be converted to wood preservative product by the addition of the required materials.

COMPARATIVE

After the precipitation of the copper arsenate in Example 2, the filtrate contained 10–15 percent by weight sodium sulfate ($Na_2SO_4$) and 50–100 parts per million arsenic as sodium arsenate ($Na_3AsO_4$). In order to dispose of this solution as a nonhazardous waste, the arsenic content had to be reduced below 0.79 parts per million.

A sample containing 300 parts per million of arsenic was used for evaluation of treating agents for arsenic reduction. Lime ($Ca(OH)_2$) or magnesium sulfate ($MgSO_4$) was added to the solution in amounts shown below, stirred for 30 minutes, and filtered. With the magnesium sulfate treatment, the final pH was adjusted by the addition of a small amount of sodium hydroxide. The arsenic in the filtrate was determined colorimetrically and by Inductively Coupled Plasma analysis.

| Treatment(grams/ 100 grams solution) | | Final pH | Arsenic (ppm) |
|---|---|---|---|
| Ca(OH)$_2$ | 0.5 | 10–12 | 259 |
|  | 1.0 | 10–12 | 181 |
|  | 2.0 | 10–12 | 150 |
| MgSO$_4$ | 1.0 | 9–10 | 4 |

These results indicate that lime and magnesium sulfate are ineffective in reducing the level of arsenic.

EXAMPLE 3

After the precipitation of the copper arsenate in Example 2, the filtrate contained 10–15 percent by weight sodium sulfate ($Na_2SO_4$) and 50–100 parts per million arsenic as sodium arsenate ($Na_3AsO_4$). In order to dispose of this solution as a nonhazardous waste, the arsenic content had to be reduced below 0.79 parts per million.

This Example was performed using 100 gram samples of the solution containing various amounts of arsenic and treating them with ferric sulfate in ratios of Fe:As(by weight) from 5:1 to 10:1. The pH was adjusted to 5–7 by the addition of NaOH and the solution containing ferric arsenate/ferric hydroxide was stirred for 30 minutes at room temperature before filtration. The arsenic in the filtrates was determined by atomic absorption.

| As in solution (ppm) | Fe:As | pH  | As in Filtrate (ppm) |
|----------------------|-------|-----|----------------------|
| 495                  | 8:1   | 7.0 | 0.60                 |
| 300                  | 5:1   | 6.4 | 1.50                 |
| 300                  | 10:1  | 6.4 | 0.20                 |
| 244                  | 10:1  | 6.7 | 0.24                 |
| 244                  | 10:1  | 5.4 | 0.21                 |
| 244                  | 10:1  | 4.6 | 0.23                 |

The results show that treatment of the solution with ferric sulfate at Fe:As ratios of 8:1 to 10:1 and pH of 5–7 reduces the arsenic levels in the final filtrate below 0.79 Ppm.

Having described the invention in detail and by reference to preferred embodiments thereof, it will be apparent that modifications and variations are possible without departing from the scope of the invention defined in the appended claims.

What is claimed is:

1. A process for reducing arsenic levels in a solution comprising sulfuric acid, water, and arsenic acid comprising the steps of:
   (a) reacting the solution with copper or a copper-containing compound in an amount sufficient and at a temperature sufficient to produce a solution containing dissolved copper arsenate;
   (b) adding alkali solution to said solution resulting from step (a) in an amount sufficient to neutralize said sulfuric acid and said arsenic acid and to precipitate said dissolved copper arsenate;
   (c) separating said precipitated copper arsenate from said solution resulting from step (b);
   (d) treating said solution resulting from step (c) with a soluble ferric-containing compound in an amount sufficient to convert the arsenate salt of the alkali to ferric arsenate wherein the amount of said soluble ferric-containing compound added is in the ratio of iron to arsenic of about 8:1 to about 10:1 and adding alkali to said solution in an amount sufficient so that the pH of said solution is about 5 to about 7; and
   (e) separating ferric arsenate formed from said solution resulting from step (d) to form a solution containing less than about 0.79 parts per million arsenic.

2. The process of claim 1 wherein said solution comprising said sulfuric acid, said water, and said arsenic acid comprises about 50 to about 60 percent by weight said sulfuric acid, about 20 to about 45 percent by weight said water, and about 5 to about 20 percent by weight said arsenic acid.

3. The process of claim 1 wherein said copper-containing compound of said step (a) is selected from the group consisting of cupric oxide, copper sulfate, copper nitrate, copper chloride, and copper hydroxide.

4. The process of claim 1 wherein said copper-containing compound of said step (a) is cupric oxide.

5. The process of claim 1 wherein in said step (a), said copper or copper-containing compound is added in an amount of about ten percent over stoichiometric.

6. The process of claim 1 wherein in said step (a), the reaction temperature is about 60° C. to about 100° C.

7. The process of claim 1 wherein in said step (b), said alkali is sodium hydroxide.

8. The process of claim 1 wherein in said step (b), said alkali solution is added in an amount sufficient to cause the pH of the solution to be about 6.5 to about 7.0.

9. The process of claim 1 wherein in said step (c), said precipitated copper arsenate is separated from said solution by filtration.

10. The process of claim 7 wherein in said step (c), said copper arsenate comprises from about 20 to about 50 percent by weight water, about 25 to about 50 percent by weight copper, about 15 to about 35 percent by weight arsenic, up to about 3 percent by weight sodium, and up to about 3 percent by weight sulfate.

11. The process of claim 1 wherein after said step (c), said solution comprises about 85 to about 90 percent by weight water, about 10 to about 15 percent by weight sodium sulfate, and about 50 to about 100 parts per million arsenic in the form of sodium arsenate.

12. The process of claim 1 wherein in said step (d), said soluble ferric compound is selected from the group consisting of ferric sulfate, ferric chloride, and ferric nitrate.

13. The Process of claim 1 wherein in said step (d), said soluble ferric compound is ferric sulfate.

14. The process of claim 1 wherein in said step (d), the amount of ferric compound added is in the ratio of Fe:As from about 8:1 to about 10:1 and pH of about 5 to about 7.

15. The process of claim 1 wherein after said step (e), said filtered solution comprises about 85 to about 90 percent by weight water, about 10 to about 15 percent by weight sodium sulfate, and below about 0.79 parts per million arsenic.

* * * * *